April 5, 1938.  E. W. GLACY  2,113,177
COASTER BRAKE AND MOUNTING
Filed Oct. 20, 1936
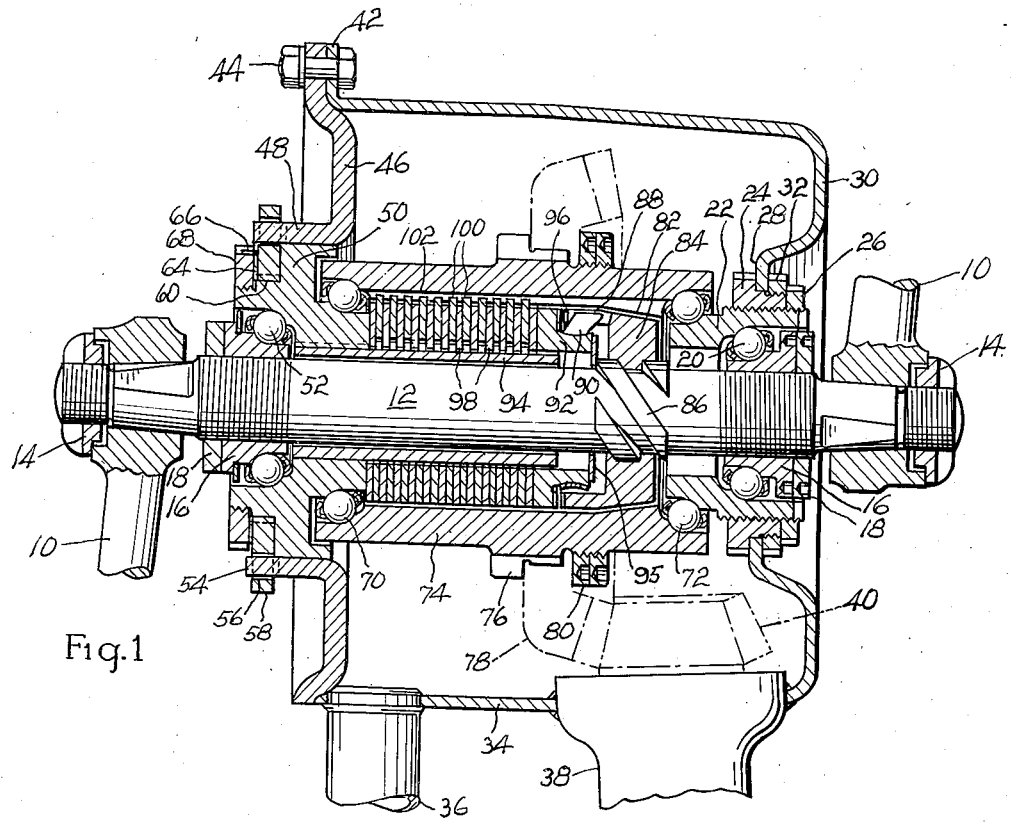
Fig. 1
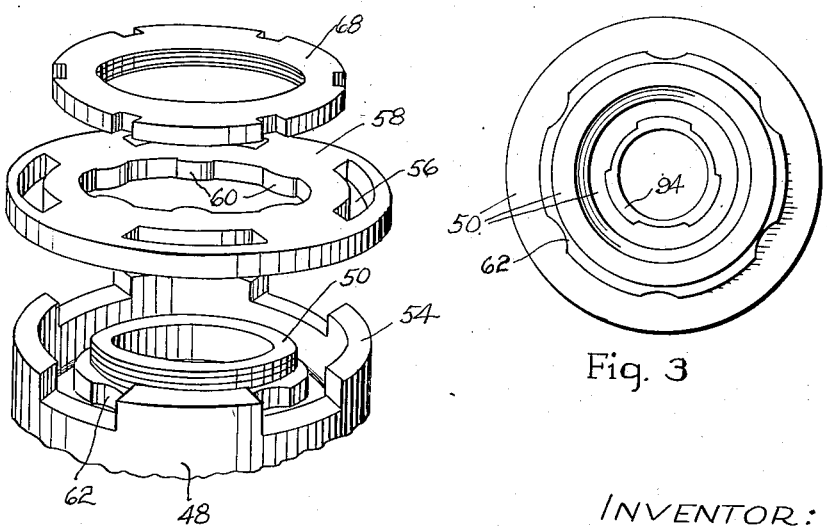
Fig. 2
Fig. 3
INVENTOR:
EDWARD W. GLACY,
BY Gales P. Moore
HIS ATTORNEY.

Patented Apr. 5, 1938

2,113,177

UNITED STATES PATENT OFFICE 2,113,177

COASTER BRAKE AND MOUNTING

Edward W. Glacy, Bristol, Conn., assignor to General Motors Corporation, Detroit, Mich., a corporation of Delaware Application October 20, 1936, Serial No. 106,616

18 Claims. (Cl. 192—6)

This invention relates to coaster brakes and mountings and comprises all of the features of novelty herein disclosed. An object of the invention is to provide an improved coaster brake especially applicable to bicycle crank hangers and to chainless drives. Another object is to provide a driving, braking and coasting unit having improved features of construction and mounting especially in regard to its adjustment, assembly, and removal with respect to a crank hanger casing. Another object is to provide an improved mounting for a driving gear to facilitate adjustment with respect to a driving gear.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a horizontal sectional view of a coaster brake mounted in the crank hanger of a bicycle.

Fig. 2 is an exploded view of parts which key an anchor block to a casing end plate.

Fig. 3 is an end view of the anchor member including its anchoring sleeve.

The numeral 10 indicates pedal arms keyed to the ends of a shaft 12 and secured thereto by nuts 14. Bearing cones 16 are threaded on the shaft and locked in adjusted position by nuts 18, the right hand cone having a raceway for antifriction balls 20 which run in a raceway groove of a fixed cup member 22. The cup member has a threaded exterior to receive a flanged nut 24 and a lock nut 26. An inturned flange 28 on a casing wall 30 is clamped against the flange of the nut 24 by a nut 32. The cup member 22 is thus secured against rotation to a crank-hanger casing which has a generally cylindrical wall 34 to which hollow frame members 36 and 38 are secured as by brazing. The frame member 38 contains a driven shaft having a bevel gear 40 indicated in broken lines.

The casing wall 34 has an outwardly extended flange 42 secured by bolts 44 to the outer periphery of a dished end plate 46 which has an axially extended flange 48 secured to an anchor block 50. The block 50 has an internal raceway groove for antifriction balls 52 which also run in a raceway groove of the left hand cone 16. The flange 48 has recesses alternating with projecting lugs 54 which enter slots 56 in a plate or ring 58 provided with internal lugs 60 entering slots or recesses 62 on an external seat of the anchor block 50, thus holding the latter against rotation but permitting axial adjustment within the flange 48. A lock washer 64 keyed to the anchor block has prongs 66 bent into notches in the exterior of a nut 68 which is threaded on the end of the anchor block thus holding the ring 58 from axial movement with respect to block 50.

The anchor block 50 has an extension provided with an external raceway for antifriction balls 70 and the cup member 22 has a similar external raceway for balls 72, the two sets of balls rotatably supporting a sleeve 74. The sleeve has a shouldered seat 76 on which a bevel gear 78 is secured by nuts 80, the bevel gear driving the above mentioned bevel gear 40 to transmit power to the rear wheels (not shown) of the bicycle.

The rotary sleeve 74 can be connected by a clutch to the pedal shaft 12 for driving purposes and it can also be braked with respect to the fixed anchor block to retard the bicycle or it can be allowed to rotate freely when coasting. The sleeve has a tapered clutch face 82 for cooperation with a similar face on an axially shiftable nut 84 which has internal threaded engagement with threads 86 on the shaft 12. The shiftable nut has a slotted flange 88 to receive a lug on an arcuate lag spring 90 which frictionally engages a rounded groove on a brake actuating member 92 which is splined to an anchoring sleeve 94. A washer 95 limits movement of the member 92 to the right. The lag spring initially retards rotation of the nut 84 with respect to the shaft 12 so that the nut will either shift into clutching engagement with the clutch face 82 for driving (depending on direction of rotation) or will shift in the opposite direction to bring clutch teeth at 96 against cooperating clutch teeth on the member 92 which is then forced axially against brake discs to produce a braking action. One set of brake discs 98 has internal lugs entering slots in the anchoring sleeve 94 and the other or alternating set of brake discs 100 has external lugs entering slots 102 of the sleeve 74. The slots in the anchoring sleeve 94 cooperate with lugs on the anchor block 50 to prevent rotation and these parts are also desirably brazed to prevent relative axial movement. The brake and pedal shaft assembly, including gear, sleeve and bearings, is removable as a unit from the crank hanger casing 34 and frame upon removal of bolts 44, nuts 26 and 32, and the right hand pedal arm.

In assembling, the bearing 70 is placed on the anchor block 50 and the brake parts are slid on the anchoring sleeve 94. The shaft 12 having the shiftable nut 84 on the threads 86 is slipped through the anchoring sleeve. The rotary sleeve 74 with the gear attached is slid over the brake parts until it engages the bearing 70. The bearing 72 is inserted in the sleeve followed by the race member 22 minus the nuts 26 and 32. The bearings 20 and 52 are next applied, the cones 16 being threaded on the shaft until all of the bearings are sufficiently tight. This unit is then passed into the open end of the casing until the flanged nut 24 engages the casing flange 28 which is clamped by the nut 32. The end plate 46 is bolted onto the casing and the ring 58 applied and locked to the anchor block. The pedals may then be attached. To procure accurate meshing of the gear 78 with the pinion, the race member 22 can be turned within the nut 24 thus shifting all connected parts axially, the anchor block sliding in the flange 48. The adjustment is then preserved by the lock nut 26.

I claim:

1. In a device of the character described, a crank hanger casing, race members anchored to the casing and each having bearings internally and externally, a crank shaft journalled for rotation in the internal bearings, and a driving sleeve surrounding the external bearings and journalled for rotation thereon; substantially as described.

2. In a device of the character described, a crank hanger casing, race members anchored to the casing and each having bearings internally and externally, a crank shaft journalled for rotation in the internal bearings, a driving sleeve surrounding the external bearings and journalled for rotation thereon, and means for detachably securing the race members to the casing whereby the crank shaft, sleeve and bearings are removable as a unit from the casing; substantially as described.

3. In a device of the character described, a crank hanger casing, a crank shaft extending through the casing, a sleeve in the casing and surrounding the shaft, and race members detachably anchored to the casing and having portions projecting axially between the sleeve and the shaft, the race members having bearings both internally and externally for supporting the shaft and the sleeve for independent rotation; substantially as described.

4. In a device of the character described, a crank hanger casing, a crank shaft extending through the casing, a sleeve in the casing and surrounding the shaft, race members anchored to the casing, each anchored race member having independent bearings for supporting the shaft and the sleeve for independent rotation, and a driving gear carried by an intermediate portion of the sleeve and housed within the casing; substantially as described.

5. In a device of the character described, a crank hanger casing, a pair of race members anchored to the ends of the casing, a crank shaft extending through the casing and journalled for rotation upon bearings inside of the anchored race members, a sleeve journalled for independent rotation in the casing upon bearings on the outside of the anchored race members, a coaster brake mounted between the sleeve and the shaft, and means providing for removal of the sleeve, the shaft, the bearings and the coaster brake as a unit from the casing without disturbing the bearing adjustment; substantially as described.

6. In a device of the character described, a crank hanger casing, race members supported by the casing, a sleeve in the casing and journalled for rotation on the race members, a shaft extending through the said race members and journalled for rotation therein, and means for axially adjusting the race members, the sleeve and the shaft as a unit with respect to the casing; substantially as described.

7. In a device of the character described, a crank hanger casing, race members supported by the ends of the casing and projecting axially within the casing, a sleeve in the casing and surrounding the axially projecting portions of the race members, antifriction bearings within the sleeve to support the sleeve for rotation on the race members, a driving gear inside the casing and carried by the sleeve, and means for adjusting the race members and the sleeve as a unit with respect to the casing to change the position of the driving gear with respect to a driven gear; substantially as described.

8. In a device of the character described, a crank hanger casing, race members supported by the ends of the casing and projecting axially within the casing, a sleeve in the casing and surrounding the axially projecting portions of the race members, antifriction bearings within the sleeve to support the sleeve for rotation on the race members, a shaft extending through the race members and journalled for rotation therein, and one of the race members having a threaded connection with the casing and the other being slidably keyed thereto to provide for axial adjustment of the sleeve, race members and shaft as a unit; substantially as described.

9. In a device of the character described, a crank hanger casing, race members supported by the casing, a sleeve in the casing and journalled for rotation on the race members, a shaft extending through the race members and journalled for rotation therein, one of the race members being threaded, a nut threaded on said race member, and means for securing the nut to the casing; substantially as described.

10. In a device of the character described, a crank hanger casing, an end plate detachably secured to the casing, race members detachably supported by the end plate and the casing, a sleeve in the casing and journalled for rotation on the race members, and a driving gear carried by the sleeve; substantially as described.

11. In a device of the character described, a crank hanger casing comprising a circumferential wall having an inwardly extending end wall, an end plate detachably secured to the open end of the casing, race members supported by the end wall and the end plate, a sleeve in the casing and journalled for rotation on the race members, and a driving gear carried by the sleeve; substantially as described.

12. In a device of the character described, a crank hanger casing comprising a circumferential wall having an inwardly extending end wall and an outwardly extending flange, an end plate detachably secured to the flange, race members supported by the end wall and the end plate, a sleeve in the casing and journalled for rotation on the race members, and a driving gear carried by the sleeve; substantially as described.

13. In a device of the character described, a crank hanger casing, an end plate secured to the casing, an anchor member slidably fitted in the end plate, a sleeve in the casing and journalled on the anchor member, and means for holding the anchor member from rotation with respect to the end plate; substantially as described.

14. In a device of the character described, a crank hanger casing, an end plate secured to the casing, an anchor member slidably fitted in the end plate, a sleeve in the casing and journalled on the anchor member, and means for holding the anchor member from rotation with respect to the end plate, said means comprising axially interfitting parts on the anchor member and the end plate; substantially as described.

15. In a device of the character described, a crank hanger casing, an end plate secured to the casing, an anchor member slidably fitted in the end plate, a sleeve in the casing and journalled on the anchor member, and means for holding the anchor member from rotation with respect to the end plate, said means comprising a slotted ring attached to the anchor member, and co-operating axial projections on the end plate; substantially as described.

16. In a device of the character described, a crank hanger casing, an end plate secured to the casing and having a flange provided with axial projections, an anchor member slidably fitted in the flange, a sleeve in the casing and journalled on the anchor member, and a ring keyed to the anchor member and having slots receiving said axial projections; substantially as described.

17. In a device of the character described, a crank hanger casing, an end plate secured to the casing, an anchor member slidably fitted in the end plate, a sleeve in the casing and journalled on the anchor member, means for holding the anchor member from rotation with respect to the end plate, and means for effecting axial adjustment of the anchor plate in the end plate; substantially as described.

18. In a device of the character described, a crank hanger casing having a circumferential wall, a sleeve journalled for rotation in the casing, a crank shaft supported by the casing for rotation independently of the sleeve and adapted for driving the sleeve, a driving gear carried by the sleeve, a driven gear meshing with the driving gear, and means comprising a movable member accessible at the outside of the casing for effecting axial adjustment of the sleeve, driving gear and crank shaft as a unit in the casing; substantially as described.

EDWARD W. GLACY.